United States Patent [19]

Aitken et al.

[11] Patent Number: 5,168,079

[45] Date of Patent: Dec. 1, 1992

[54] THALLIUM GALLATE GLASSES

[75] Inventors: Bruce G. Aitken, Corning; Nicholas F. Borrelli, Elmira, both of N.Y.

[73] Assignee: Corning Incorporated, Corning, N.Y.

[21] Appl. No.: 785,458

[22] Filed: Oct. 31, 1991

[51] Int. Cl.$^5$ .............. C03C 3/12; C03C 3/253; C03C 3/002; C03C 3/07

[52] U.S. Cl. .............................. 501/41; 501/42; 501/73; 501/74; 501/904

[58] Field of Search .............. 501/41, 42, 73, 74, 501/904

[56] References Cited

U.S. PATENT DOCUMENTS

| | | | |
|---|---|---|---|
| 3,723,141 | 3/1973 | Dumbaugh, Jr. | 501/42 |
| 4,483,931 | 11/1984 | Dumbaugh, Jr. | 501/41 |
| 5,093,287 | 3/1992 | Borrelli et al. | 501/41 |
| 5,093,288 | 3/1992 | Aitken et al. | 501/42 |

*Primary Examiner*—Mark L. Bell
*Attorney, Agent, or Firm*—C. S. Janes, Jr.

[57] ABSTRACT

This invention relates to glasses exhibiting very high optical non-linearity, very high Verdet constants, very high electro-optic constants, and excellent transmissions of infrared radiation. The glasses consist essentially, in cation percent, of:

| | | | |
|---|---|---|---|
| $TlO_{0.5}$ | 20–55 | $GeO_2$ | 0–17 |
| $BiO_{1.5}$ | 0–67 | $PbO$ | 0–40 |
| $GaO_{1.5}$ | 13–30 | $TlO_{0.5} + BiO_{1.5} + PbO$ | 70–87 |
| $SiO_2$ | 0–5 | $TeO_2$ | 0–5 |

2 Claims, 1 Drawing Sheet

THALLIUM GALLATE GLASSES

BACKGROUND OF THE INVENTION

Glasses containing high concentrations of the heavy metal ions $Tl^+$, $Pb^{+2}$, and/or $Bi^{+3}$ have been reported as being characterized in exhibiting unusually high third order optical susceptibility $\chi_3$, a large diamagnetic Verdet constant, and excellent infrared radiation transmission. Those properties have rendered glasses containing those heavy metals ideally suited for such applications as active optical devices, optical isolators, and infrared windows.

Degenerate four wave mixing measurements of $\chi_3$ on a number of heavy metal oxide (HMO) glasses have indicated that, of the three heavy metal ions $Tl^+$, $Pb^{+2}$, and $Bi^{+3}$, $Tl^+$ makes the largest overall contribution on an atomic basis to the overall $\chi_3$ of HMO glasses. United States application Ser. No. 07/618,939 (Aitken et al.), filed Nov. 28, 1990, now U.S. Pat. No. 5,093,288, discloses glasses consisting essentially, expressed in terms of cation percent on the oxide basis, of 15-60% $TlO_{0.5}$, 10-45% $BiO_{1.5}$, 5-40% $GeO_2$, and 0.5-10% $GaO_{1.5}$, wherein $TlO_{0.5}+BiO_{1.5} \geqq 60\%$ and $GeO_2+GaO_{1.5} \geqq 15\%$, the sum of $TlO_{0.5}+BiO_{1.5}+GeO_2+GaO_{1.5}$ constituting at least 85% of the total composition. As optional components, the application notes the inclusion of up to 15% total of up to 10% $SiO_2$ and up to 5% $TeO_2$. The highest values of $\chi_3$ measured on glasses in that composition system ranged between $71-88 \times 10^{-14}$ esu.

The primary objective of the present invention was to devise glass compositions exhibiting very high optical non-linearity, coupled with a very high Verdet constant, while retaining excellent infrared transmission.

SUMMARY OF THE INVENTION

That objective was achieved in glasses having base compositions within the thallium gallate system. More specifically, the inventive glasses consist essentially, expressed in terms of cation percent on the oxide basis, of:

| | | | |
|---|---|---|---|
| $TlO_{0.5}$ | 20-55 | $GeO_2$ | 0-17 |
| $BiO_{1.5}$ | 0-67 | PbO | 0-40 |
| $GaO_{1.5}$ | 13-30 | $TlO_{0.5} + BiO_{1.5} + PbO$ | 70-87 |
| $SiO_2$ | 0-5 | $TeO_2$ | 0-5 |

PbO, $Bi_2O_3$ and $GeO_2$ are important accessory oxides, not only because of their effect upon the physical properties of the final glass, but also because of their advantageous effect upon the melting and forming characteristics of the glasses. For glasses having a $GaO_{1.5}$ content of 13-25%, the concentration of PbO must be held below 25%, however, in order to avoid devitrification. In glasses containing 25-30% $GaO_{1.5}$, PbO may be present in amounts up to 40%. $GaO_{1.5}$ is deemed to replace $GeO_2$ in the glass structure and it was found that, the higher the level of $GaO_{1.5}$, the larger the value of $\chi_3$. In addition, the use of $GaO_{1.5}$ instead of $GeO_2$ as the dominant or sole glass forming oxide was found to render the inventive glasses much more resistant to devitrification, thereby permitting the casting of homogeneous glass articles having thickness dimensions of 1 cm and greater. Therefore, to produce glasses of good glass quality exhibiting very high optical non-linearity with exceptionally large values of $\chi_3$, e.g., in excess of $90 \times 10^{-14}$ esu, the $GaO_{1.5}$ content will be present in an amount of at least 13% and the concentration of $GeO_2$ will be maintained below 17%. The very high heavy metal ion content leads to large diamagnetic magneto-optic effects (Verdet constant) and excellent infrared radiation transmission.

Whereas it is not mathematically possible to convert composition ranges expressed in terms of cation percent to exact composition ranges expressed in terms of weight percent, the following values represent approximations of the base compositions of the inventive glasses in terms of weight percent:

| | | | |
|---|---|---|---|
| $Tl_2O$ | 20.2-66.1 | $GeO_2$ | 0-9.9 |
| $Bi_2O_3$ | 0-74.7 | PbO | 0-49.8 |
| $Ga_2O_3$ | 5.8-15.8 | $Tl_2O+Bi_2O_3+PbO$ | 80-94 |
| $SiO_2$ | 0-1.7 | $TeO_2$ | 0-4.4 |

PRIOR ART

Figure 1:
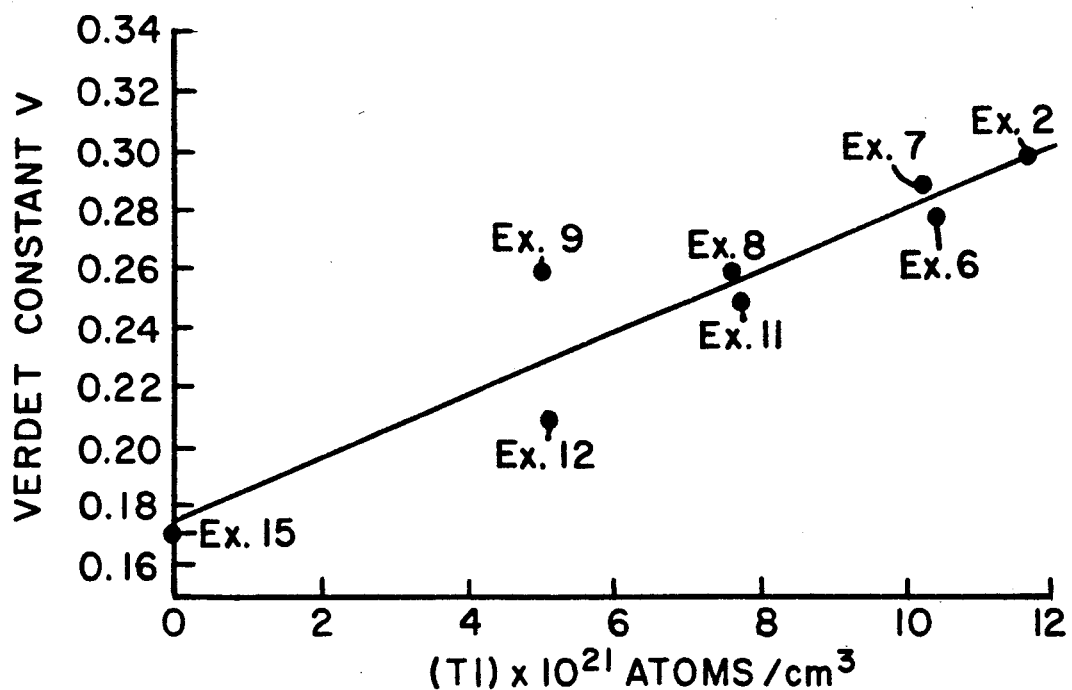
FIG. 1 comprises a graph illustrating the relationship between the value of the Verdet constant exhibited by a glass and the $Tl_2O$ content thereof.

In addition to Ser. No. 07/618,939, now U.S. Pat. No. 5,093,288, the following references relating to glasses exhibiting high optical non-linearity and/or good infrared radiation transmission are briefly reviewed.

U.S. application Ser. No. 07/618,938 (Borrelli et al.), filed Nov. 28, 1990, now U.S. Pat. No. 5,093,287, discloses glasses demonstrating high optical non-linearity and good infrared radiation transmission consisting essentially, in weight percent, of 42-48% PbO, 33-44% $Bi_2O_3$, 10-15% $Ga_2O_3$, and up to 15% total of at least one member of the group of up to 5% $SiO_2$ and/or $GeO_2$ and up to 15% $Tl_2O$. The $Tl_2O$ level is lower than is required in the present inventive glasses.

U.S. Pat. No. 3,723,141 (Dumbaugh, Jr.) describes the formation of infrared transmitting glasses consisting essentially, in weight percent, of 10-85% $Bi_2O_3$, 10-75% PbO, $Bi_2O_3 + PbO > 60\%$, 2-25% BaO, 1-10% ZnO, $SiO_2 + B_2O_3 + P_2O_5 < 1\%$, and up to 20% total of the following oxides in amounts not exceeding 10% individually: CaO, SrO, CdO, HgO, $Tl_2O_3$, $TiO_2$, $GeO_2$, $Sb_2O_3$, $As_2O_3$, the transition metal oxides, and the alkali metal oxides. $Ga_2O_3$ is nowhere mentioned.

U.S. Pat. No. 4,483,931 (Dumbaugh, Jr. et al.) is directed to glasses consisting essentially, in weight percent, of 10-85% PbO, 5-30% $Ga_2O_3$, up to 85% $Bi_2O_3$, and up to 30% total of the following materials in the indicated properties of:

| | | | | | |
|---|---|---|---|---|---|
| $Cs_2O$ | 0-20 | ZnO | 0-5 | $Na_2O$ | 0-2 |
| HgO | 0-30 | $K_2O$ | 0-2 | $In_2O_3$ | 0-10 |
| $Tl_2O_3$ | 0-20 | $Cr_2O_3$ | 0-5 | $SiO_2$ | 0-2 |
| $Sb_2O_3$ | 0-10 | $MnO_2$ | 0-5 | $ZrO_2$ | 0-5 |
| $TeO_2$ | 0-10 | CuO | 0-2 | $Nb_2O_5$ | 0-5 |
| $Rb_2O$ | 0-5 | CdO | 0-12 | $Ta_2O_5$ | 0-5 |
| $HfO_2$ | 0-5 | $GeO_2$ | 0-5 | Halogen | 0-5 |
| $Al_2O_3$ | 0-3 | | | | |

$Tl_2O_3$ is an optional ingredient only, appearing in a single working example, and the maximum permitted is less than the minimum required in the instant inventive glasses.

In "Glass Formation in the System GeO$_2$-Bi$_2$O$_3$-Tl$_2$O", *Journal of the American Ceramic Society*, 65 (1982) 197–203, authored by K. Nassau and D. L. Chadwick, the preparation of glasses in the ternary oxide system containing Ge, Bi, and Tl was discussed. No reference was made to Ga$_2$O$_3$.

U.S. Pat. No. 4,790,619 (Lines et al.) is drawn to core glasses for use in optical fibers, the glasses consisting of a first major component selected from the group of GeO$_2$, SiO$_2$, AsO$_{1.5}$, and combination thereof, and a heavy metal second component selected from the group of PbO, BiO$_{1.5}$, SbO$_{1.5}$, TlO$_{0.5}$, and combinations thereof. Ga$_2$O$_3$ is not mentioned.

Description of Preferred Embodiments

Table I reports a group of glass compositions melted and formed on a laboratory scale and tabulated in terms of parts by weight on the oxide basis which illustrate the subject invention. Because the sum of the individual components totals or very closely approximates 100, for all practical purposes the recited values may be considered to reflect weight percent. Table IA lists the same group of glass compositions expressed in terms of cation percent. The actual batch ingredients may comprise any materials, either oxides or other compounds, which, when melted together, are converted into the desired oxides in the proper proportions. For example, either TlNO$_3$ or Tl$_2$CO$_3$ may be utilized as the source of thallium.

The batch materials were compounded, tumble mixed together to assist in obtaining a homogeneous melt, and then charged into gold crucibles. After placing lids thereon, the crucibles were moved into a furnace operating between about 875°–1000° C. and the batches were melted for about 15–30 minutes. Thereafter, the melts were poured into steel or graphite molds to produce glass discs having a diameter of about 4 cm and a thickness of about 7–8 mm which were transferred immediately to an annealer operating at about 220°–260° C.

It will be appreciated that, whereas the above description reflects activity performed in the laboratory, the inventive glasses are capable of being melted in large scale commercial melting units and formed into articles of desired configurations employing techniques conventional in the glass art. Hence, in accordance with standard glass melting and forming practices, it is only necessary that the batch materials be blended together thoroughly, that batch melted at temperatures and for times sufficient to produce a homogeneous melt, that melt cooled and simultaneously shaped into a glass article of a desired geometry, and that glass article normally annealed.

TABLE I

|  | 1 | 2 | 3 | 4 | 5 | 6 | 7 | 8 |
|---|---|---|---|---|---|---|---|---|
| Tl$_2$O | 56.2 | 50.6 | 56.5 | 44.5 | 44.6 | 44.7 | 43.1 | 32.0 |
| Bi$_2$O$_3$ | 30.8 | 37.0 | 31.0 | 42.7 | 42.8 | 42.9 | 47.3 | 58.6 |
| Ga$_2$O$_3$ | 7.4 | 12.4 | 12.5 | 7.4 | 9.8 | 12.3 | 9.5 | 9.4 |
| GeO$_2$ | 5.5 | — | — | 5.5 | 2.8 | — | — | — |

|  | 9 | 10 | 11 | 12 | 13 | 14 | 15 | 16 |
|---|---|---|---|---|---|---|---|---|
| Tl$_2$O | 21.0 | 54.5 | 33.2 | 21.9 | 41.2 | 43.6 | — | — |
| PbO | — | — | — | — | 43.3 | 22.9 | 46.0 | — |
| Bi$_2$O$_3$ | 69.5 | 35.9 | 54.6 | 66.0 | — | 23.9 | 42.0 | 84.3 |
| Ga$_2$O$_3$ | 9.3 | 9.6 | 12.2 | 12.1 | 15.6 | 9.6 | 12.0 | 12.1 |

TABLE I-continued

| Cs$_2$O | — | — | — | — | — | — | — | 3.6 |
|---|---|---|---|---|---|---|---|---|

TABLE IA (Cation %)

|  | 1 | 2 | 3 | 4 | 5 | 6 | 7 | 8 |
|---|---|---|---|---|---|---|---|---|
| TlO$_{0.5}$ | 50 | 45 | 50 | 40 | 40 | 40 | 40 | 30 |
| BiO$_{1.5}$ | 25 | 30 | 25 | 35 | 35 | 35 | 40 | 50 |
| GaO$_{1.5}$ | 15 | 25 | 25 | 15 | 20 | 25 | 20 | 20 |
| GeO$_2$ | 10 | — | — | 10 | 5 | — | — | — |

|  | 9 | 10 | 11 | 12 | 13 | 14 | 15 | 16 |
|---|---|---|---|---|---|---|---|---|
| TlO$_{0.5}$ | 20 | 50 | 30 | 20 | 35 | 40 | — | — |
| PbO | — | — | — | — | 35 | 20 | 40.1 | — |
| BiO$_{1.5}$ | 60 | 30 | 45 | 55 | — | 20 | 34.9 | 70 |
| GaO$_{1.5}$ | 20 | 20 | 25 | 25 | 30 | 20 | 25 | 25 |
| CsO$_{0.5}$ | — | — | — | — | — | — | — | 5 |

Table II, reports the density (Den.) in terms of grams/cm$^3$ and the linear index of refraction ($n_D$) determined in accordance with measuring techniques conventional in the glass art, along with the Verdet constant (V) at a wavelength of 633 mm expressed in terms of min/Oe-cm, the electro-optic constant (B) as measured at a wavelength of 633 in units of 10$^{-6}$ cm/kV$^2$, and the infrared radiation transmission (IR), expressed in terms of microns. The Verdet constant is calculated from the equation $$\Delta\theta = VHl$$

where $\Delta\theta$ represents the experimentally measured polarization rotation, H is the magnetic field, and l is the thickness of the sample. The electo-optic constant is derived from the equation $$\Delta n = \lambda BE^2$$

where $\Delta n$ represents the experimentally determined birefringence, $\lambda$ is the wavelength, and E is the electric field. Finally, Table II also lists values for $\chi_3$ in terms of 10$^{-14}$ esu, as estimated from an empirical proportionality relating $\chi_3$ and B, via., $\chi_3 \sim 30B$. Such extraordinarily high values of $\chi_3$ have been attributed to two factors:

(a) the use of Tl$_2$O is one of the dominant heavy metal components; and
(b) the use of Ga$_2$O$_3$ instead of GeO$_2$ as the major or sole network forming oxide.

TABLE II

|  | 1 | 2 | 3 | 4 | 5 | 6 | 7 | 8 |
|---|---|---|---|---|---|---|---|---|
| Dens. | 8.006 | 8.123 | 8.184 | 8.095 | 8.139 | 8.195 | 8.368 | 8.388 |
| $n_D$ | — | — | — | — | — | 2.44 | 2.47 | 2.47 |
| V | — | 0.30 | — | — | — | 0.28 | 0.29 | 0.26 |
| B | — | — | — | — | — | — | 4.3 | 3.0 |
| IR | — | — | — | — | — | — | 6.7 | 6.8 |
| X$_3$ | — | — | — | — | — | — | 130 | 90 |

|  | 9 | 10 | 11 | 12 | 13 | 14 | 15 | 16 |
|---|---|---|---|---|---|---|---|---|
| Dens. | 8.396 | 8.389 | 8.214 | 8.231 | 7.952 | 8.375 | 8.187 | 7.954 |
| $n_D$ | 2.45 | — | 2.44 | 2.40 | — | — | 2.46 | 2.36 |
| V | 0.26 | — | 0.25 | 0.21 | — | — | — | 0.17 |
| B | 2.1 | — | 2.3 | 2.1 | — | — | 1.3 | — |
| IR | — | — | — | — | 6.7 | 6.6 | — | — |
| X$_3$ | 63 | — | 69 | 63 | — | — | 39 | — |

As can be observed from the physical property data recorded in Table II, all of the inventive glasses are characterized by high refractive indices at the sodium D line ($n_D$), viz., values ranges between about 2.4–2.5, with the higher values of $n_D$ corresponding to the higher concentrations of $Tl_2O$.

In addition, the magnetic-optic measurements recited in Table II clearly illustrate that the inventive glasses exhibit exceptionally high diamagnetic, i.e., positive, Verdet constants. The values tabulated there are believed to constitute the highest diamagnetic measurements reported for oxide glasses. The Verdet constant is essentially independent of temperature for diamagnetic materials, whereas it varies inversely with temperature for paramagnetic glasses, i.e., glasses demonstrating a negative Verdet constant. Therefore, the present inventive glasses are superior to such paramagnetic glasses as terbium-and dysprosium-doped glasses exhibiting similar absolute values of Verdet constant.

As is immediately evident from an examination of FIG. 1, a strong positive correlation exists between the Verdet constant exhibited by a particular glass and the $Tl_2O$ constant thereof. Thus, the glasses containing the greatest concentrations of $Tl_2O$ display the highest Verdet constants. This correlation between $Tl_2O$ content and Verdet constant is further substantiated by the relatively low Verdet constant exhibited by Example 16, viz., 0.17. Example 16 is a heavy metal oxide glass containing no $Tl_2O$ and, consequently, is outside of the composition intervals of the subject inventive glasses. The Examples from Table I comprising the basis of the graph are recorded on FIG. 1.

Furthermore, the inventive glasses are also characterized by a high electro-optic constant (B), as can be observed from Table II. And, B, like the Verdet constant, displays a similar correlation with $Tl_2O$ concentration, viz., B of the inventive glasses increasing regularly with increased $Tl_2O$ content. This relationship between the electro-optic constant and the $Tl_2O$ level is confirmed by the relatively low electro-optic constant displayed by Example 15, viz., 1.3. Example 15 is a heavy metal gallate glass which is free of $Tl_2O$ and, consequently, lies outside of the composition ranges of the present inventive glasses. Again, the Examples comprising the basis of the curve are designated on FIG. 2.

Finally, as can be observed from Table II, the inventive glasses are additionally characterized by excellent transmission in the infrared portion of the electromagnetic spectrum. Infrared cutoff values (IR), reported as the wavelength (in microns) at which transmission drops below 40% for 2.8 mm thick samples, extend to almost 7 microns, and are among the highest reported for oxide glasses.

Figure 2:
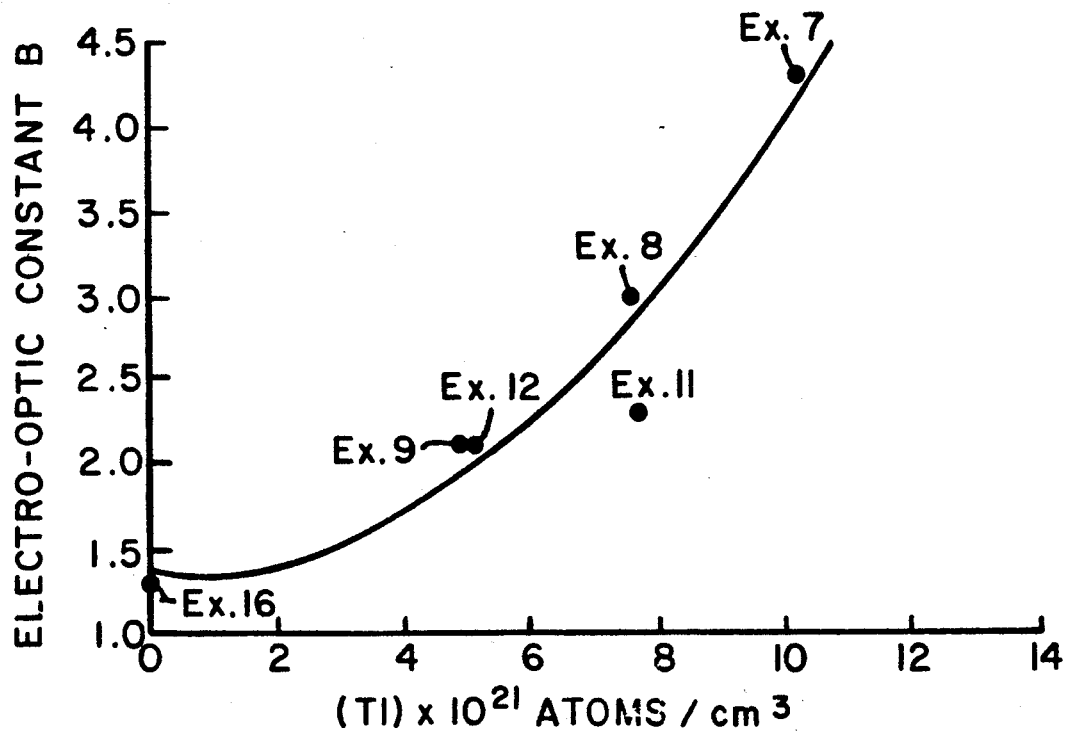
FIG. 2 comprises a graph illustrating the relationship between the value of the electro-optic constant exhibited by a glass and the $Tl_2O$ content thereof.

In both FIGS. 1 and 2, the thallium content of the glass is expressed in atoms/cm$^3$ of glass.

Based upon an overall review of physical properties, coupled with the melting and forming behaviors, the preferred compositions of the inventive glasses consist essentially, expressed in terms of cation percent on the oxide basis, of:

| | | | |
|---|---|---|---|
| $Tl0_{0.5}$ | 25–50 | $GeO_2$ | 0–10 |
| $BiO_{1.5}$ | 20–62 | PbO | 0–30 |
| $GaO_{1.5}$ | 13–25 | $Tl0_{0.5}+BiO_{1.5}+PbO$ | 75–87 |
| $SiO_2$ | 0–5 | $TeO_2$ | 0–5 |

Based upon the overall combination of properties, the most preferred composition is Example 7.

I claim:

1. A glass exhibiting very high optical non-linearity, a very high Verdet constant, a very high electro-optic constant, and excellent infrared radiation transmission consisting essentially, expressed in terms of cation percent on the oxide basis, of:

| | | | |
|---|---|---|---|
| $Tl0_{0.5}$ | 20–55 | $GeO_2$ | 0–17 |
| $BiO_{1.5}$ | 0–67 | PbO | 0–40 |
| $GaO_{1.5}$ | 13–30 | $Tl0_{0.5} + BiO_{1.5} + PbO$ | 70–87 |
| $SiO_2$ | 0–5 | $TeO_2$ | 0–5. |

2. A glass according to claim 1 consisting essentially of:

| | | | |
|---|---|---|---|
| $Tl0_{0.5}$ | 25–50 | $GeO_2$ | 0–10 |
| $BiO_{1.5}$ | 20–62 | PbO | 0–30 |
| $GaO_{1.5}$ | 13–25 | $Tl0_{0.5}+BiO_{1.5}+PbO$ | 75–87 |
| $SiO_2$ | 0–5 | $TeO_2$ | 0–5. |

* * * * *